United States Patent [19]
Miller et al.

[11] Patent Number: 6,019,999
[45] Date of Patent: Feb. 1, 2000

[54] PROCESS FOR MAKING LIPOSOMAL ION-EXCHANGE WHEY PROTEIN AND PRODUCTS THEREOF

[76] Inventors: David F. Miller, 1525 Camelot Dr., Corona, Calif. 91720; Ian Hicks, 5967 Jacaranda La., Yorba Linda, Calif. 92887; Charles B. Quick, 12031 Waldemar, Houston, Tex. 77077; Joey Antonio, 3516 Ave. E, Kearney, Nebr. 68847; Ian J. Reynolds, 401 W. Spreading Oaks, Friendswood, Tex. 77546; David Rush, 1239 Fawn Valley, League City, Tex. 77573; S. Keith Klein, IV, 10314 Lynbrook Hollow, Houston, Tex. 77042

[21] Appl. No.: 09/203,771

[22] Filed: Dec. 2, 1998

Related U.S. Application Data

[60] Provisional application No. 60/067,792, Dec. 3, 1997.

[51] Int. Cl.⁷ .............................. A61K 9/127; A23J 1/00; A23C 17/00
[52] U.S. Cl. ........................ 424/450; 424/460; 424/461; 424/462; 530/414; 530/416; 530/418; 530/419; 530/422; 530/424; 530/427; 426/271; 426/330.1; 426/330.2; 426/583; 426/588; 426/656
[58] Field of Search ..................................... 424/450, 460, 424/461, 462; 530/414, 416, 418, 419, 422, 424, 427; 426/271, 330.1, 330.2, 583, 588, 656

[56] References Cited

U.S. PATENT DOCUMENTS

| 3,234,199 | 2/1966 | Reid | 260/112 |
|---|---|---|---|
| 5,082,664 | 1/1992 | Lenk et al. | 424/450 |
| 5,096,730 | 3/1992 | Singer et al. | 426/583 |
| 5,262,168 | 11/1993 | Lenk et al. | 424/450 |
| 5,413,804 | 5/1995 | Rhodes | 426/583 |
| 5,427,813 | 6/1995 | Suido et al. | 426/583 |
| 5,489,445 | 2/1996 | Suido et al. | 426/583 |

OTHER PUBLICATIONS

J. Antonio and W. Gonyea, "Muscle Fiber Splitting in Stretch–Enlarged Avian Muscle," *Medicine and Science in Sports and Exercise*, vol. 26, No. 8 pp. 973–977, 1994.

P.W. Lemon, "Protein and Amino Acid Needs of the Strength Athlete," *International Journal of Sport Nutrition*, vol.1, No. 2, pp. 127–145, 1991.

M. Poullain et al., "Effect of Whey proteins, Their Oligopeptide Hydrolysates and Free Amino Acid Mixtures on Growth and Nitrogen Retention in Fed and Starved Rats," *Journal of Parental and Enteral Nutrition*, vol. 13, No. 4, pp. 382–386, 1989.

*Primary Examiner*—Cecilia Tsang
*Assistant Examiner*—Abdel A. Mohamed
*Attorney, Agent, or Firm*—David M. O'Brian

[57] ABSTRACT

Described is a process for making a liposomal, ion-exchange whey protein and products thereof, which result in the sustained release of amino acids into the body's circulation to generally promote skeletal muscle protein synthesis, decrease body fat in association with diet modification and improve exercise performance. The whey protein is preferably encapsulated in a liposome using a cold, or non-heated, process. After the liposomal, ion-exchange whey protein has been prepared, it is then preferably lyophilized to deliver macronutrients for use as a sports nutrition supplement and for use in medical or clinical catabolic applications.

28 Claims, 6 Drawing Sheets

| SUBJECT | 0 HR (BASE) | 1 HR POST | 2 HR | 3.5 HR | 5 HR | 6.5 HR | 8 HR |
|---|---|---|---|---|---|---|---|
| TEST SUBJECT NO.1 | 36946574 | 28783304 | 28900380 | 28478051 | 31597193 | 37689229 | 45981127 |
| TEST SUBJECT NO.2 | 36227513 | 38359943 | 49632242 | 43946272 | 47055760 | 47955313 | 46524581 |
| TEST SUBJECT NO.3 | 20161942 | 25765784 | 29993607 | 26020746 | 14468211 | 28405146 | 32949576 |
| TEST SUBJECT NO.4 | 11212251 | 12854756 | 10871015 | 13417097 | 12016741 | 29385360 | 34819050 |
| MEAN | 26137070 | 26440947 (+1.2%) | 29849311 (+14.2%) | 27965542 (+7.0%) | 26284476 (+0.6%) | 35858762 (+37.2%) | 40068584 (+53.3%) |

TABLE 1.   ALL AMINO ACIDS PEAK AREA

FIG.2

| SUBJECT | 0 HR (BASE) | 1 HR POST | 2 HR | 3.5 HR | 5 HR | 6.5 HR | 8 HR |
|---|---|---|---|---|---|---|---|
| TEST SUBJECT NO.1 | 2363769 | 2394264 | 2352205 | 2330127 | 2448708 | 3142074 | 2599954 |
| TEST SUBJECT NO.2 | 2727505 | 2735081 | 3420476 | 2980162 | 3112316 | 3267419 | 3185777 |
| TEST SUBJECT NO.3 | 2455168 | 2538310 | 2633592 | 2561892 | 3437115 | 2665292 | 2457201 |
| TEST SUBJECT NO.4 | 2510551 | 2837518 | 2393337 | 3310782 | 2882068 | 3481999 | 2650165 |
| MEAN | 2514248 | 2626293 (+4.5%) | 2699902 (+7.4%) | 2795740 (+11.2%) | 2970051 (+18.1%) | 3139196 (+24.9%) | 2723274 (+8.3%) |

TABLE 2. GLUTAMINE PEAK AREA

FIG.3

| SUBJECT | 0 HR (BASE) | 1 HR POST | 2 HR | 3.5 HR | 5 HR | 6.5 HR | 8 HR |
|---|---|---|---|---|---|---|---|
| TEST SUBJECT NO.1 | 539786 | 757463 | 535940 | 492219 | 555920 | 642669 | 527681 |
| TEST SUBJECT NO.2 | 558861 | 691132 | 867715 | 553933 | 564955 | 669710 | 629306 |
| TEST SUBJECT NO.3 | 458274 | 637229 | 672358 | 482568 | 630523 | 453808 | 485390 |
| TEST SUBJECT NO.4 | 430579 | 660076 | 454765 | 483963 | 470557 | 627375 | 482491 |
| MEAN | 496875 | 686475 (+39.2%) | 481420 (−3.1%) | 503171 (+1.3%) | 555489 (+11.8%) | 598391 (+20.4%) | 531217 (+6.9%) |

TABLE 3. LEUCINE PEAK AREA

FIG.4

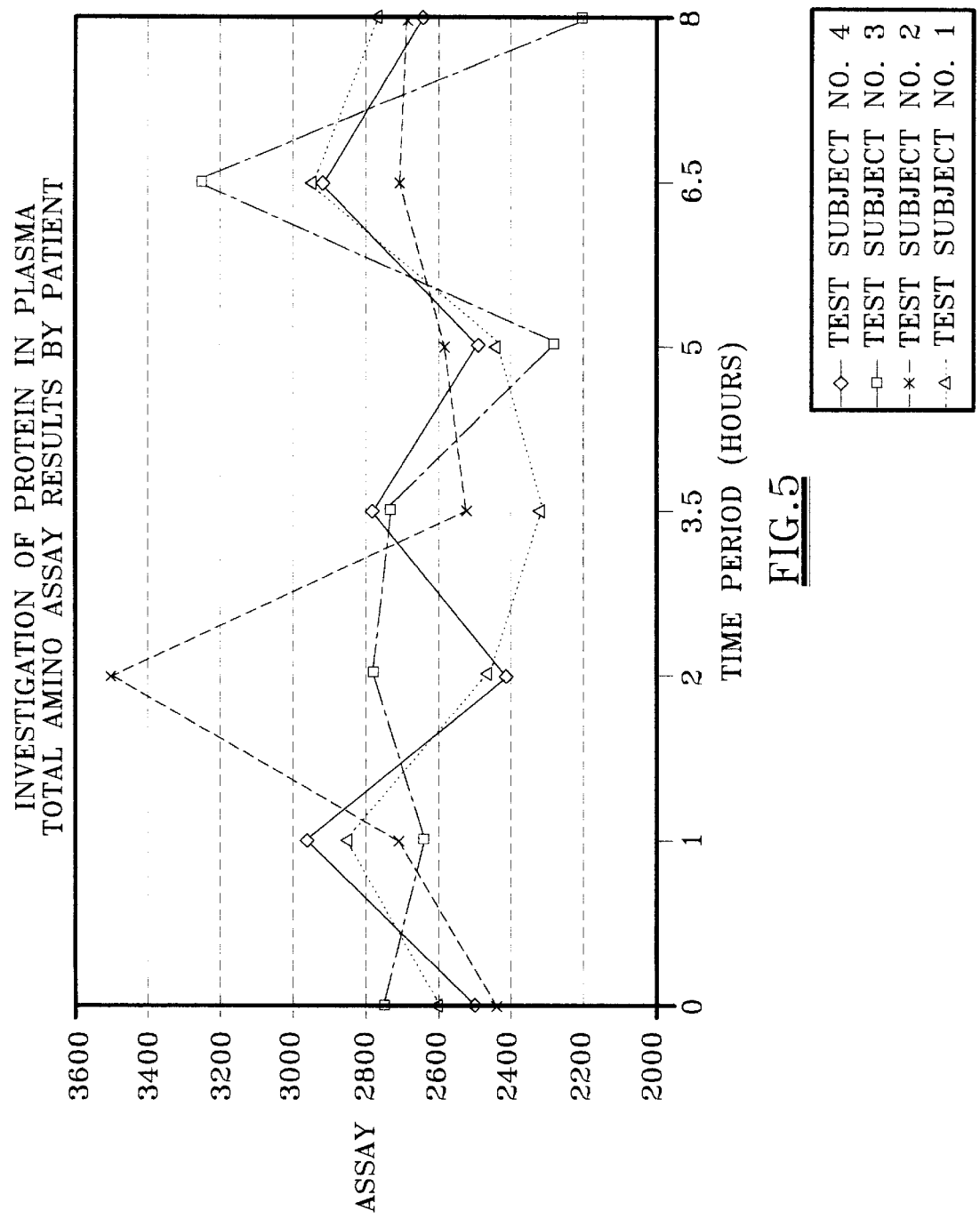

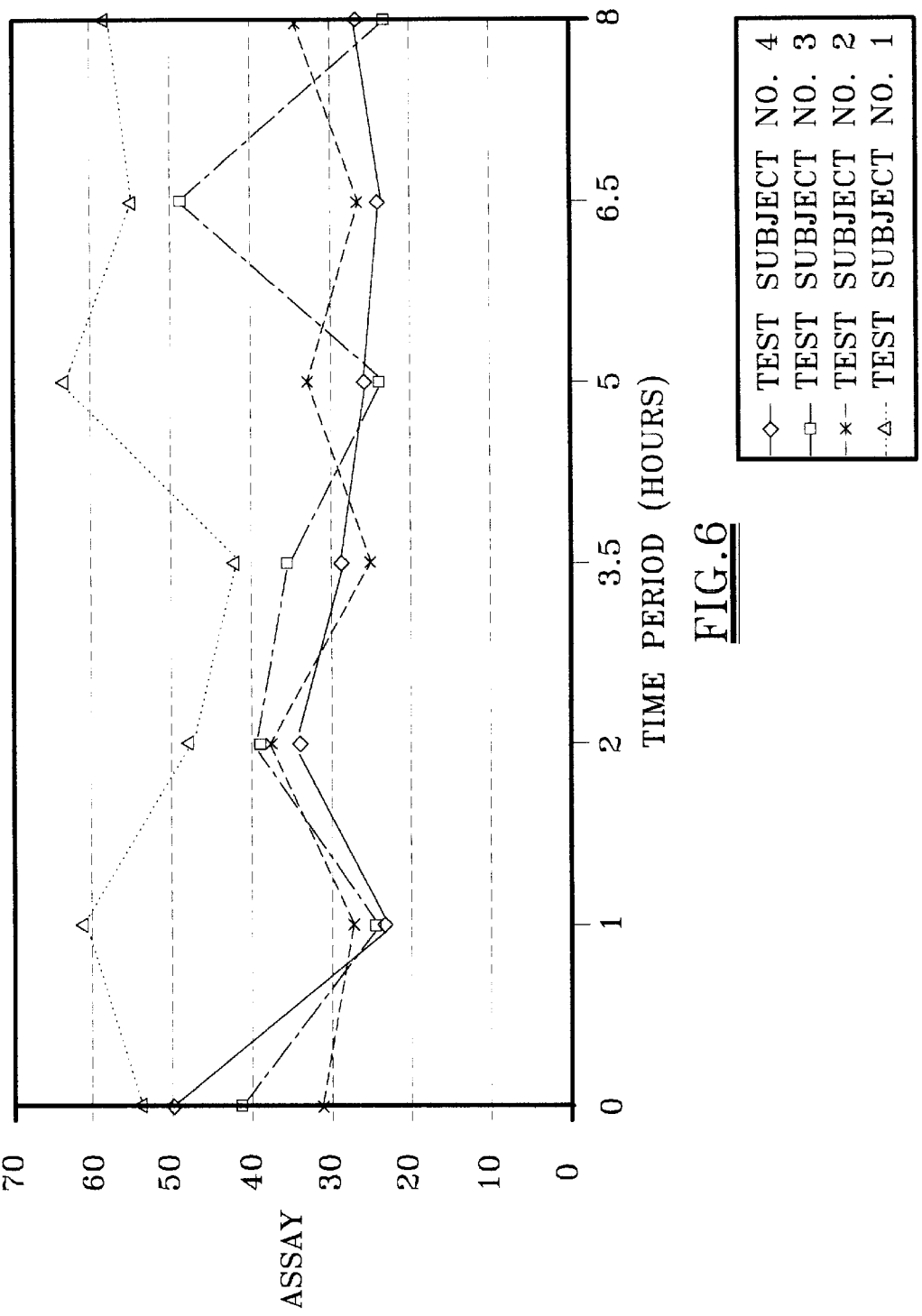

PROCESS FOR MAKING LIPOSOMAL ION-EXCHANGE WHEY PROTEIN AND PRODUCTS THEREOF

Priority for this non-provisional patent application is claimed under 35 U.S.C. § 119, pursuant to Applicant's provisional patent application, application Ser. No. 60/067,792, filed on Dec. 3, 1997.

FIELD OF THE INVENTION

The present invention relates generally to a method for making a timed release protein supplement and products therefor. Specifically, the present invention relates to a process for making a liposomal, ion-exchange whey protein, which results in the sustained release of amino acids into the body's circulation to promote skeletal muscle protein synthesis, to improve body composition and exercise performance.

BACKGROUND OF THE INVENTION

The plasticity of human skeletal muscle, with regard to growth and atrophy, continues to be of great interest, especially in the areas of medicine, sports and nutrition. Additionally, the study of patients' catabolic conditions, especially in clinical and/or hospital situations, including prolonged bed rest, human immunodeficiency virus, post trauma (i.e., burns, surgery) and hormonal disorders (i.e., Cushing's Syndrome), the loss of body weight and/or the loss of muscle protein is of particular importance. As observed in catabolic conditions, muscle protein degradation normally exceeds muscle protein synthesis, which is a concern the present invention addresses.

Skeletal muscle hypertrophy or growth is characterized by gains in myofibrillar mass and muscle fiber hyperplasia, as discussed by J. Antonio and W. Gonyea, "Muscle Fiber Splitting In Stretch-Enlarged Avian Muscle," Medicine and Science in Sports and Exercise, Vol. 26, No. 8, pp. 973–977, 1994. Strenuous resistance exercise has been shown to promote the elevation of muscle protein synthesis rates for a period of up to 24 hours, after the completion of the exercise. Possible explanations for this hypertrophic response include: elevated levels of anabolic hormones (i.e., testosterone, growth hormone, insulin-like growth factor), muscle stretch, and an overcompensation of protein synthesis to repair injured or damaged muscle tissue. Additionally, it is well known that many athletes eat frequent meals throughout the day in an attempt to maintain skeletal muscle in a continuous anabolic state.

Although the precise mechanism for increased protein synthesis is not completely understood, it is apparent that amino acids must be available for there to be a net increase in muscle protein. In essence, protein intake is critical in the etiology of skeletal muscle hypertrophy. Simply providing protein, regardless of its source, may not be the most effective way of promoting the anabolic environment or drive in exercise-trained skeletal muscle. In terms of bioavailability, animal sources of protein are superior to plant sources of protein.

The recommended dietary intake (RDI) for protein is 0.8 grams/kg body weight per day. However, it has been demonstrated that in resistance-trained athletes, the intake for protein should be approximately twice the normal RDI (1.5–2.0 grams/kg body weight per day), P. W. Lemon, "Protein And Amino Acid Needs Of The Strength Athlete," International Journal of Sport Nutrition, Vol. 1, No. 2, pp. 127–145, 1991. One preferred source of animal protein is dairy whey. Additionally, the results of weight gain and nitrogen retention, both important in muscle building, are improved using whey protein hydrolysate, as compared to using whole proteins. M. Poullain et al., "Effect Of Whey Proteins, Their Oligopeptide Hydrolysates and Free Amino Acid Mixtures on Growth and Nitrogen Retention in Fed and Starved Rats," Journal of Parental and Enteral Nutrition, Vol. 13, No. 4, pp. 382–386, 1989. Conversely, the use of free amino acid mixtures appear to be the least effective means for weight gain and/or nitrogen retention. Thus, it has now been discovered that a novel process for making liposomal, ion-exchange whey protein and introducing it into the body, results in the sustained release of amino acids, which promotes an increase in muscle mass and offsets certain catabolic conditions.

Although the need for such process of making a liposomal ion-exchange whey protein and the products thereof, have been long felt, the prior art, heretofore, has not provided such a process and/or product which meets all of the aforementioned criterion.

Additional features and advantages of the invention will be set forth in part in the description which follows, and in part will become apparent from the description, or may be learned by practice of the invention. The features and advantages of the invention may be realized by means of the combinations and steps particularly pointed out in the appended claims.

SUMMARY OF THE INVENTION

To achieve the foregoing objects, features and advantages in accordance with the purpose of the invention as embodied and broadly described herein, a process for making liposomal, ion-exchange whey protein, and products thereof, is set forth herein. The process generally comprises the steps of mixing a quantity of ultrapure water with a quantity of sugar in a first container, to create a first solution having a pH of 5.0 or less. Then agitating the first solution until the sugar is completely dissolved therein. Thereafter, mixing a quantity of ultrapure water with a quantity of preservative in a second container, to create a second solution, and agitating the second solution until the preservative is completely dissolved therein. Thereafter, adding a quantity of soy phosphatidylcholine and/or a quantity of soy phosphatidylserine, and a quantity of ethanol to the second solution. The second solution is then added into the first container with the first solution. Thereafter a quantity of protein is added to the combined first solution and second solution to form a product mixture. The product mixture is then homogenized to reduce the particle size of all solids contained therein. Finally, the product mixture is lyophilized to remove the water and create a dry, solid product. The solid product can then easily be packaged and distributed.

The dry solid product is liposomal, ion-exchange whey protein, having the physical characteristics of a flaky, light, tan-colored powder, comprising liposomes ranging from 90 nm to 200 nm in diameter. The dry solid product further has a faint characteristic odor similar to that of dried milk powder. The liposomal, ion-exchange whey protein, produced by the process of the preferred embodiment, generally delivers macronutrients to the body by adsorption over time from the gastrointestinal tract, leading to a continual supply of nutrients for 6–8 hours.

It is an object of the present invention to produce an ion-exchange whey protein, encased in a liposome, which, when ingested, will result in the sustained release of amino acids in the human body.

Another object of the present invention to produce an ion-exchange whey protein, encased in a liposome, for increasing muscle mass.

Yet another object of the present invention is to produce an ion-exchange whey protein, encased in a liposome, for decreasing body fat in association with appropriate exercise and dietary changes.

Still another object of the present invention is to produce an ion-exchange whey protein, encased in a liposome, which results in improved exercise performance.

Another object of the present invention is to produce an ion-exchange whey protein, encased in a liposome, using a cold process.

Yet another object of the present invention is to produce an ion-exchange whey protein to be combined with carbohydrates and/or amino acids, all of which are encased in a liposome, for the treatment of catabolic conditions in patients at clinical and/or hospital situations.

Still another object of the present invention is to produce a liposomal protein from any one or a combination of proteins, the group consisting of, whey protein isolates, whey protein concentrate, whey peptides, whey dipeptides, oligopeptides, polypeptides, oligopeptides, soy protein (including dipeptides, polypeptides and oligopeptides), casein protein, and egg albumin protein.

Another object of the present invention is to produce a liposomal, ion-exchange whey protein from any one or a combination of carbohydrates, the group consisting of, monosaccharide, oligopolysaccharide, and polysaccharide, including but not limited to sucrose, glucose, fructose, lactose, galactose, maltose, maltodextrin, glucofuranose and glucopyranose.

BRIEF DESCRIPTION OF THE DRAWINGS

The accompanying drawings which are incorporated into and constitute a part of this specification, illustrate a preferred embodiment of the invention and together with a general description of the invention given above and the detailed description of the preferred embodiment given below serve to explain the principals of the invention.

FIG. 2 illustrates a table of all amino acids peak area measurement of four test subjects and the mean thereof, the test subjects being healthy males between the ages of 30 and 45, wherein the amino acid measurements were taken at a 1 hour, 2 hour 3.5 hour, 5 hour, 6.5 hour and 8 hour interval after the test subjects had ingested the liposomal, ion-exchange whey protein processed according to the present invention.

FIG. 3 illustrates a table of glutamine amino acid measurement of the four test subjects in FIG. 2, wherein the amino acid measurements were taken at a 1 hour, 2 hour 3.5 hour, 5 hour, 6.5 hour and 8 hour interval after the test subjects had ingested the liposomal, ion-exchange whey protein processed according to the present invention.

FIG. 4 illustrates a table of leucine amino acid measurement of the four test subjects in FIG. 2, wherein the amino acid measurements were taken at a 1 hour, 2 hour 3.5 hour, 5 hour, 6.5 hour and 8 hour interval after the test subjects had ingested the liposomal, ion-exchange whey protein processed according to the present invention.

FIG. 5 illustrates a total amino acid assay regarding the four test subjects in FIG. 2.

FIG. 6 illustrates a glutamine assay regarding the four test subjects in FIG. 4.

Figure 1:
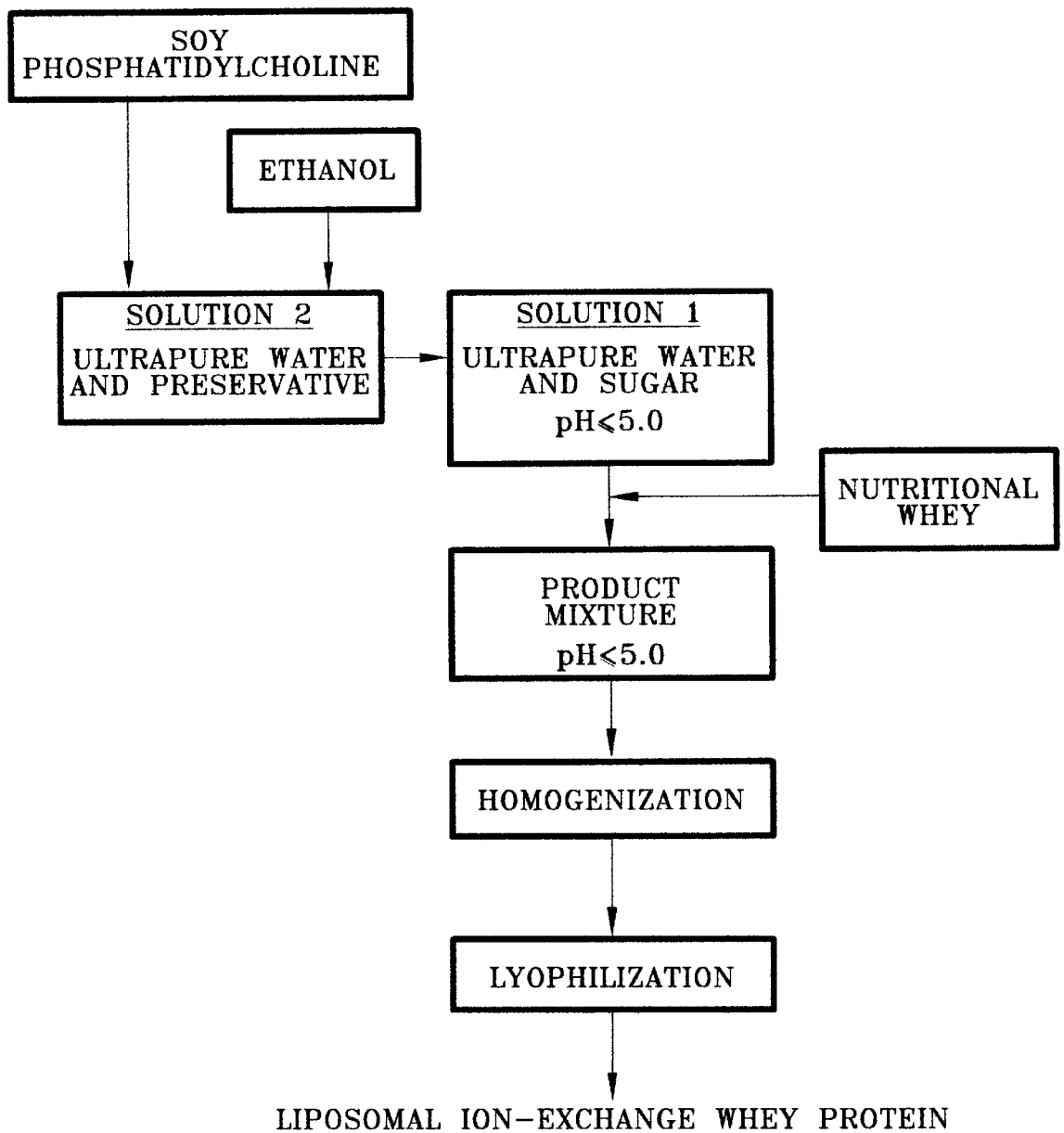
FIG. 1 is a flow diagram illustrating the preferred embodiment process for making liposomal, ion-exchange whey protein.

The above general description and the following detailed description are merely illustrative of the generic invention and additional modes, advantages and particulars will be readily suggested to those skilled in the art without departing from the spirit and the scope of the invention.

DETAILED DESCRIPTION OF THE INVENTION

The preferred embodiment method of making liposomal ion-exchange whey protein, and products thereof, is generally depicted in FIG. 1. With reference to FIG. 1, a quantity of ultrapure water, which is microbiologically, aromatically and particulately cleansed, is added to a quantity of sugar, both of which are mixed in a first glass container, to create a first solution having a pH of 5.0 or less. If the pH is greater than 5.0 the sugar should be checked for impurities and the procedure should be re-started. The sugar may, for example, be one or a combination of the following group, sucrose, glucose, fructose, lactose, galactose, maltose, maltodextrin, glucofuranose and glucopyranose. In the preferred embodiment, maltodextrin, a string of maltose molecules, is used. The first solution is then agitated or mixed until the maltodextrin is completely dissolved within the ultrapure water. A second solution is then created by mixing a second quantity of ultrapure water with a quantity of preservative in a second glass container. The preservative may, for example, be one or a combination of the following group of antioxidants and/or antimicrobials, including for example, methylparaben, propyl-paraben, disodium EDTA, sodium benzoate, citric acid or butylated hydroxytoluene. In the preferred embodiment, the preservative butylated hydroxytoluene is generally used, commonly known as "BHT." The second solution is then agitated or mixed until all of the preservative is completely dissolved therein. A quantity of soy phosphatidylcholine (SPC) and a quantity ethanol are then added to the second solution, and the second solution is then agitated again. Alternatively, instead of adding a quantity of SPC, a quantity of soy phosphatidylserine or a combination of soy phosphatidylserine and SPC could be added to the second solution. The first solution and the second solution are then mixed together. While mixing the first solution at a moderately fast pace, the second solution is added to the first solution in a drop-wise rate of approximately 2 drops per second. Next, a quantity of nutritional whey is added to the combined first and second solution, to form a product mixture. The SPC may also, for example, be combined with or substituted with a quantity of soy phosphatidylserine and/or egg phosphatidylcholine (EPC) and/or egg phosphatidylserine (EPS). The ethanol is anhydrous, 190-proof, which provides an emulsifying effect on the product solution. The nutritional whey used in the preferred process is a dairy whey, however alternative types of whey could also be used, including whey protein isolates, whey protein concentrate, whey peptides, whey dipeptides, oligopeptides, polypeptides, soy protein, casein and egg albumin.

After the nutritional whey is added to create the product mixture, the product mixture is then agitated or mixed and the pH is measured and recorded. If the pH is above 5.0, then the process is ceased, the product mixture is disposed of, and the ingredients are examined for purity. If the pH of the product mixture is 5.0 or lower, the product mixture is then homogenized. At this point in the process, a quantity of citric acid may be added to the product mixture to stabilize the pH of the mixture.

The homogenization of the product mixture, requires that the entire product mixture pass through a homogenizer with a psi range of 2,500 psi to 40,000 psi, for example a microfluidizer, model no. M21 or M610, manufactured by Microfluidics Corp. Thereafter, a one-fourth portion of the homogenized product mixture is removed and retained in a third container. The remaining product mixture is then homogenized again and thereafter, a one-third portion of the product mixture is drawn and retained in a fourth container. The remaining product mixture is homogenized again and thereafter a one-half portion of product mixture is drawn off and retained in a fifth container. The remaining product mixture is yet again homogenized, and thereafter the separated one-fourth product mixture portion in the third container; and the separated one-third product mixture portion in the fourth container; and the separated one-half portion of the removed product mixture in the fifth container, are added back to the remaining product mixture in the first container. The combined product mixture is then agitated and mixed.

The homogenized and combined product mixture is then lyophilized to remove the water from the homogenized and combined product mixture, to produce a dry, solid product. A typical lyophilizer might include, model no. 300 FXS 550-SS25C, manufactured by Hull, which includes a condenser feature and a vacuum feature. Lyophilization occurs by placing the product mixture into conventional lyophilizer containers, which are then placed into the lyophilizer. The shelf temperature of the lyophilizer is then lowered to a range of between −30° C. and −50° C. The temperature of the product mixture is then preferably lowered to a minimum temperature of at least −20° C. The condenser is then engaged to separate the solid product in the product mixture, from the water. The temperature of the condenser, may, for example, be lowered to a minimum temperature of −55° C. During this time, the vacuum may be engaged to remove the water. The vacuum may, for example, operate for a period of 18–28 hours and at a level of below 70 mT. Thereafter the shelf temperature is elevated to +25° C. The temperature of the solid product is elevated to at least +20° C., while operating the lyophilizer for an additional 24 hours. The solid product can then be packaged and distributed accordingly.

Alternatively, another process may be use to obtain a dry product from the product mixture. One alternative process for drying the product mixture is the spraying of the product mixture into a gas or electrically heated commercial spray dryer, wherein the initial air temperature within the dryer is in the range of 130° F. to 155° F. As the product mixture moves through the spray dryer, the heat removes the moisture and the finished, dry product is received within a conventional collection container used with the commercial spray dryer. The finished, dry product may, for example, have a moisture content of 5% or less.

The physical characteristics of the liposomal, ion-exchange whey protein product, produced by the preferred embodiment process specifically include: a flaky, beige to light tan-colored powder with a characteristic odor of dried milk powder. The product is dry and flows smoothly when poured from a container. The liposomal, ion-exchange whey protein, produced by the preferred embodiment process, mixes rapidly with water. Although the precise mechanism for increased protein synthesis is not completely understood, it is apparent that amino acids must be available for there to be a net increase in muscle protein. In essence, protein intake is critical in the etiology of skeletal muscle hypertrophy. Simply providing protein, regardless of its source, may not be the most effective way of promoting the anabolic environment or drive in exercise-trained skeletal muscle.

Generally, the nutritional status is severely degraded in victims of various chronic diseases. Diseases such as anorexia, mal-digestion, mal-absorption and impaired hepatic and renal metabolism result in weight loss, lowered immune function and overall poor quality of life. In these diseases, cachexia is often made worse by limited food intake. Additional diseases such as, pancreatis, AIDS, chronic hepatitis, Krohn's disease and other forms of chronic colitis are just a few examples of diseases in which cachexia is made worse by limited food intake. Additionally, malnutrition in the elderly is commonly associated with chronic disease or disability, which results in their inability to care for themselves. Chronic cancer and debilitating heart disease emphasize the need for an improved nutritional delivery system. The liposomal, ion-exchange whey protein produced by the method described herein, is intended to increase absorption and elevate serum levels of protein and amino acids over a longer period of time, reducing the catabolic effect of chronic disease, and in many cases, may aid in anabolic growth and may promote enhanced recovery or remission of the disease symptoms. Standard whey protein, not utilizing a liposomal shell, is generally not well absorbed by patients in these diseased states and thus will not produce elevated amino acid levels for an extended period of time. Further, patients taking standard non-liposomal protein are required to consume a greater volumes of non-liposomal protein. These patients, due to their lowered health conditions, are generally unable to tolerate elevated volumes of non-liposomal protein.

FIG. 2 illustrates the table of all amino acids peak area of four test subjects, all males between the ages of 30–45, after ingestion of the liposomal, ion-exchange whey protein, produced by the preferred embodiment process. The all amino acids peak area table illustrates a modest increase in the presence of amino acids during the 2 hour and 3.5 hour test intervals, with a decline at the 5 hour test interval. The amino acids of the test subjects in FIG. 2, exhibited their highest peak areas at the 6.5 hour and the 8 hour test intervals. The significance of the reported increase in peak amino acid area is that the administration of liposomal whey protein can produce an early rise in plasma amino acids as well as subsequent increase over time, for example, over a continuous 6–8 hour period. The maintenance of high levels of plasma amino acids is believed to promote the accumulation of skeletal muscle protein.

FIG. 3 illustrates the table of glutamine peak area, as measured in the four test subjects after ingestion of the liposomal, ion-exchange whey protein, produced by the preferred embodiment process. The data in FIG. 3 reveals a similar early rise in peak area, however, glutamine levels tend to be sustained at relatively high levels from the 3.5 hour to 6.5 hour test interval. Moreover, the data contained in FIG. 3 suggests that levels of this amino acid can be sustained for a prolonged period of time, for example 6–7 hours. High levels of glutamine are necessary for optimal immune system function, as well as assisting in the maintenance of skeletal muscle protein.

FIG. 4 is a table of leucine peak area, measured in the four test subjects after ingestion of the liposomal, ion-exchange whey protein, produced by the preferred embodiment method. The data in FIG. 3 shows that the leucine level in the test subjects, generally exhibited a very early increase in peak area at the 1 hour test interval, a decline at the 2 hour and 3.5 hour test intervals, followed by a large increase at the 5 hour and 6.5 hour test interval. The 8 hour test interval in FIG. 3 showed minor increase in the four test subjects' leucine level at the 8 hour interval. Further, FIG. 4 demonstrates similarities to that of glutamine and would indicate that the maintenance of high levels of plasma leucine might contribute to greater nitrogen balance.

FIG. 5 is a graphical depiction of the total amino assay results of each of the four test subjects after ingesting liposomal, ion-exchange whey protein, produced by the preferred embodiment process. The total amino assay illustrates an increase in amino acids at the 1 hour and the 6.5 hour test intervals. The 2 hour, 3.5 hour and 5 hour test intervals did not yield a uniform increase or decrease in total amino acids. Additionally, FIG. 5 indicates a bimodal pattern of total amino acid peak areas. This data suggests that the liposomal delivery of whey protein from the preferred embodiment method, results in a quick rise in plasma amino acids with a subsequent leveling off. The later increase in plasma amino acid levels may indicate that liposomes are releasing amino acids several hours post-ingestion, in a time-released manner.

FIG. 6 is a graphical depiction of the glutamine assay results of each of the four test subjects, after ingesting liposomal, ion-exchange whey protein, produced by the preferred embodiment process. The results shown in FIG. 6 show a relatively constant level of glutamine in the four test subjects over the eight hour test interval, which supports the desired effect of sustained release of amino acids in the body when using the liposomal, ion-exchange whey protein, produced using the preferred embodiment process.

The data represented in FIGS. 2–6, indicate a trend toward a bimodal absorption pattern of the degraded whey protein, produced using the preferred embodiment process. The bimodal absorption pattern is shown, whereby, after ingesting the liposomal, ion-exchange whey protein, an initial rise in protein is followed by a decrease, which is followed by yet another increase of protein in the plasma levels. FIGS. 3 and 6 showed a sustained elevation of glutamine in the plasma, with no decline until the 8 hour test interval. Leucine, alternatively, showed a bimodal pattern similar to that seen when all amino acids were combined.

The use of liposomal, ion-exchange whey protein as a delivery system protein (all amino acids combined) supplement may be useful in that it can result in the maintenance of levels of plasma amino acids that are higher than the ingestion of protein form conventional animal and/or plant sources.

It is asserted that the liposomal delivery of various proteins and amino acids by the process of the preferred embodiment, including, without limitation: whey protein isolates, whey protein concentrate, whey peptides, whey dipeptides, oligopeptides, polypeptides, soy protein, casein, egg albumin; and alanine, arginine, aspartic acid, cysteine, glutamine, glycerine, proline, serine, tyrosine, histidine, isoleucine, leucine, lysine, methionine, phenylalanine, threonine, tryptophan, taurine and valine, will lead to superior gains in lean body mass, muscle mass, decreasing body fat with appropriate exercise and diet regimens and improving exercise performance. Moreover, the process of the preferred embodiment provides for the sustained elevation of required nutrients, even during periods of rest.

Additional embodiments become readily apparent in view of the present invention as described herein above. Having described the invention above various modifications of the techniques, procedures and materials will be apparent to those skilled in the art. It is intended that all such variations within the scope and spirit of the appended claims be embraced thereby.

What is claimed is:

1. A process for making liposomal, ion-exchange whey protein, comprising the steps of:
   mixing a quantity of ultrapure water with a quantity of sugar in a first container, to create a first solution having a pH of 5.0 or less and agitating said first solution until said sugar is completely dissolved therein;
   mixing a quantity of ultrapure water with a quantity of preservative in a second container, to create a second solution and agitating said second solution until said preservative is completely dissolved therein;
   adding a quantity of soy phosphatidylcholine and a quantity of ethanol to said second solution and agitating said solution;
   mixing said second solution into said first container with said first solution;
   adding a quantity of nutritional whey to said combined first and second solution to form a product mixture, thereafter agitating said product mixture and measuring the pH of said product mixture to determine that the pH is 5.0 or lower;
   homogenizing said product mixture to reduce the particle size of all solids therein; and
   lyophilizing the product mixture to remove the water and produce a dry solid product.

2. The method of claim 1, wherein said dry solid product is liposomal, ion-exchange whey protein.

3. The method of claim 1, wherein the second solution is added to the first solution at a dropwise rate of approximately 2 drops per second.

4. The method of claim 1, wherein the homogenizing step further comprises the steps of:
   homogenizing said product mixture and thereafter separating a one-fourth portion of said product mixture and retaining said separated one-fourth portion in a third container;
   homogenizing said remaining product mixture and thereafter separating a one-third portion of said product mixture and retaining said separated one-third portion in a fourth container;
   homogenizing said remaining product mixture and thereafter separating a one-half portion of said product mixture and retaining said one-half portion in a fifth container; and
   homogenizing said remaining product mixture and thereafter combining said separated one-fourth portion, and said separated one-third portion, and said separated one-half portion, and said remaining product mixture in the first container, and thereafter agitating said combined product mixture.

5. The method of claim 1, wherein the sugar is selected from the group consisting of sucrose, glucose, fructose, lactose, galactose, maltose, maltodextrin, glucofuranose, glucopyranose and combinations thereof.

6. The method of claim 5, wherein the sugar is maltodextrin.

7. The method of claim 1, wherein the protein is selected from the group consisting of dairy whey, whey protein isolates, whey protein concentrate, whey peptides, whey ogliopeptides, whey polypeptides, whey dipeptides, soy protein, casein protein, egg albumin and combinations thereof.

8. The method of claim 7, wherein the protein is dairy whey.

9. The method of claim 1, wherein the preservative is selected from the group consisting of methyl-paraben, propyl-paraben, disodium EDTA, sodium benzoate, citric acid, butylated hydroxytoluene and combinations thereof.

10. The method of claim 9, wherein the preservative is butylated hydroxytoluene.

11. The method of claim 1, wherein the lyophilization step further comprises the steps of:
   inserting said product mixture into a lyophilizer and lowering a shelf temperature of said lyophilizer to a range of between −30° C. and −50° C.;
   lowering the temperature of said product mixture to a minimum temperature of at least −20° C.;
   engaging a condenser within said lyophilizer to separate a solid product from the water in the product mixture, wherein the temperature of said condenser is lowered to a minimum temperature of at least −55° C.;
   engaging a vacuum within said lyophilizer to remove the water, wherein said vacuum operates for a predetermined period of time and at a level of at least 70 mT;
   elevating the shelf temperature of said lyophilizer to +25° C.; and
   elevating the temperature of the solid product to at least +20° C., while operating the lyophilizer for an additional period of time.

12. The method of claim 11, wherein the predetermined period of time in which the vacuum operates in the lyophilizer, is in the range of from 18–20 hours.

13. The method of claim 11, wherein after the solid product is allowed to reach a temperature of at least +20° C., the lyophilizer operates for an additional 24 hours.

14. A process for making liposomal, ion-exchange whey protein, comprising the steps of:
   mixing a quantity of ultrapure water with a quantity of sugar in a first container, to create a first solution having a pH of 5.0 or less and agitating said first solution until said sugar is completely dissolved therein;
   mixing a quantity of ultrapure water with a quantity of preservative in a second container, to create a second solution and agitating said second solution until said preservative is completely dissolved therein;
   adding a quantity of substance selected from the group consisting of soy phosphadylcholine, soy phosphatidylserine, egg phosphadylcholine and combinations thereof and also adding a quantity of ethanol to said second solution and agitating said solution;
   mixing said second solution into said first container with said first solution;
   adding a quantity of nutritional whey to said combined first and second solution to form a product mixture, thereafter agitating said product mixture and measuring the pH of said product mixture to determine that said pH is 5.0 or lower;
   homogenizing said product mixture to reduce the particle size of all solids therein; and
   lyophilizing the product mixture to remove the water and produce a dry solid product.

15. The method of claim 14, wherein said dry solid product is liposomal, ion-exchange whey protein.

16. A process for making liposomal, ion-exchange whey protein, comprising the steps of:
   mixing a quantity of ultrapure water with a quantity of maltodextrin in a first container, to create a first solution having a pH of 5.0 or less and agitating said first solution until said maltodextrin is completely dissolved therein;
   mixing a quantity of ultrapure water with a quantity of butylated hydroxytoluene in a second container, to create a second solution and agitating said second solution until said butylated hydroxytoluene is completely dissolved therein;
   adding a quantity of soy phosphatidylcholine and a quantity of ethanol to said second solution and agitating said solution;
   mixing said second solution into said first container with said first solution wherein the second solution is added to the first solution at a dropwise rate of approximately 2 drops per second;
   adding a quantity of dairy whey to said combined first and second solution to form a product mixture in said first container, thereafter agitating said product mixture and measuring the pH of said product mixture to determine that said pH is 5.0 or lower;
   homogenizing said product mixture to reduce the particle size of all solids therein; and
   lyophilizing the product mixture to remove the water and produce a dry solid product.

17. The method of claim 16, wherein said dry solid product is liposomal, ion-exchange whey protein.

18. The method of claim 16, wherein the homogenizing step further comprises the steps of:
   homogenizing said product mixture in said first container and thereafter separating a one-fourth portion of said product mixture and retaining said separated one-fourth portion in a third container;
   homogenizing said remaining product mixture and thereafter separating a one-third portion of said product mixture and retaining said separated one-third portion in a fourth container;
   homogenizing said remaining product mixture and thereafter separating a one-half portion of said product mixture and retaining said one-half portion in a fifth container; and
   homogenizing said remaining product mixture and thereafter combining said separated one-fourth portion of said product mixture from said third container, with said separated one-third portion of said product mixture from said fourth container, with said separated one-half portion of said product mixture from said fifth container, with said remaining product mixture in the first container, and thereafter agitating said combined product mixture.

19. The method of claim 16, wherein the lyophilization step further comprises the steps of:
   inserting said product mixture into a lyophilizer and lowering a shelf temperature of said lyophilizer to a range of between −30° C. and −50° C.;
   lowering the temperature of said product mixture to a minimum temperature of at least −20° C.;
   engaging a condenser within said lyophilizer to separate a solid product from the water in the product mixture, wherein the temperature of said condenser is lowered to a minimum temperature of at least −55° C.;
   engaging a vacuum within said lyophilizer to remove the water, wherein said vacuum operates for a predetermined period of time and at a level of at least 70 mT;
   elevating the shelf temperature of said lyophilizer to +25° C.; and
   elevating the temperature of the solid product to at least +20° C., while operating the lyophilizer for an additional period of time.

20. The method of claim 19, wherein the predetermined period of time in which the vacuum operates in said lyophilizer, is in the range of from 18–20 hours.

21. The method of claim 19, wherein after the solid product is allowed to reach a temperature of at least +20° C., the lyophilizer operates for an additional 24 hours.

22. A process for making liposomal, ion-exchange whey protein, comprising the steps of:

mixing a quantity of ultrapure water with a quantity of maltodextrin in a first container, to create a first solution having a pH of 5.0 or less and agitating said first solution until said maltodextrin is completely dissolved therein;

mixing a quantity of ultrapure water with a quantity of butylated hydroxytoluene in a second container, to create a second solution and agitating said second solution until said butylated hydroxytoluene is completely dissolved therein;

adding a quantity of soy phosphatidylcholine and a quantity of ethanol to said second solution and agitating said solution;

mixing said second solution into said first container with said first solution wherein the second solution is added to the first solution at a dropwise rate of approximately 2 drops per second;

adding a quantity of dairy whey to said combined first and second solution to form a product mixture in said first container, thereafter agitating said product mixture and measuring the pH of said product mixture to determine that said pH is 5.0 or lower;

homogenizing said product mixture in said first container and thereafter separating a one-fourth portion of said product mixture and retaining said separated one-fourth portion in a third container; homogenizing said remaining product mixture and thereafter separating a one-third portion of said product mixture and retaining said separated one-third portion in a fourth container; homogenizing said remaining product mixture and thereafter separating a one-half portion of said product mixture and retaining said one-half portion in a fifth container; homogenizing said remaining product mixture and thereafter combining said separated one-fourth portion of said product mixture from said third container, with said separated one-third portion of said product mixture from said fourth container, with said separated one-half portion of said product mixture from said fifth container, with said remaining product mixture in the first container, and thereafter agitating said combined product mixture; and lyophilizing the combined product mixture to remove the water and produce a dry solid product.

23. The method of claim 22, wherein said dry solid product is liposomal, ion-exchange whey protein.

24. A process for making liposomal, ion-exchange whey protein, comprising the steps of:

mixing a quantity of ultrapure water with a quantity of maltodextrin in a first container, to create a first solution having a pH of 5.0 or less and agitating said first solution until said maltodextrin is completely dissolved therein;

mixing a quantity of ultrapure water with a quantity of butylated hydroxytoluene in a second container, to create a second solution and agitating said second solution until said butylated hydroxytoluene is completely dissolved therein;

adding a quantity of soy phosphatidylcholine and a quantity of ethanol to said second solution and agitating said solution;

mixing said second solution into said first container with said first solution wherein the second solution is added to the first solution at a dropwise rate of approximately 2 drops per second;

adding a quantity of dairy whey to said combined first and second solution to form a product mixture in said first container, thereafter agitating said product mixture and measuring the pH of said product mixture to determine that said pH is 5.0 or lower;

homogenizing said product mixture in said first container and thereafter separating a one-fourth portion of said product mixture and retaining said separated one-fourth portion in a third container; homogenizing said remaining product mixture and thereafter separating a one-third portion of said product mixture and retaining said separated one-third portion in a fourth container; homogenizing said remaining product mixture and thereafter separating a one-half portion of said product mixture and retaining said one-half portion in a fifth container; homogenizing said remaining product mixture and thereafter combining said separated one-fourth portion of said product mixture from said third container, with said separated one-third portion of said product mixture from said fourth container, with said separated one-half portion of said product mixture from said fifth container, with said remaining product mixture in the first container, and thereafter agitating said combined product mixture; and lyophilizing the product mixture to remove the water and produce a dry solid product by inserting said product mixture into a lyophilizer and lowering a shelf temperature of said lyophilizer to a range of between −30° C. and −50° C.; lowering the temperature of said product mixture to a minimum temperature of at least −20° C.; engaging a condenser within said lyophilizer to separate a solid product from the water in the product mixture, wherein the temperature of said condenser is lowered to a minimum temperature of at least −55° C.; engaging a vacuum within said lyophilizer to remove the water, wherein said vacuum operates for a predetermined period of time and at a level of at least 70 mT; elevating the shelf temperature of said lyophilizer to +25° C.; and elevating the temperature of the solid product to at least +20° C., while operating the lyophilizer for an additional period of time.

25. The method of claim 24, wherein said dry solid product is liposomal, ion-exchange whey protein.

26. A process for making liposomal, ion-exchange whey protein, comprising the steps of:

mixing a quantity of ultrapure water with a quantity of sugar in a first container, to create a first solution having a pH of 5.0 or less and agitating said first solution until said sugar is completely dissolved therein;

mixing a quantity of ultrapure water with a quantity of preservative in a second container, to create a second solution and agitating said second solution until said preservative is completely dissolved therein;

adding a quantity of soy phosphatidylcholine and a quantity of ethanol to said second solution and agitating said solution;

mixing said second solution into said first container with said first solution;

adding a quantity of nutritional whey to said combined first and second solution to form a product mixture, thereafter agitating said product mixture and measuring the pH of said product mixture to determine that said pH is 5.0 or lower;

homogenizing said product mixture to reduce the particle size of all solids therein; and drying the product mixture by spraying the product mixture into a heated commercial spray dryer to remove the water and produce a dry solid product.

27. The method of claim 26, wherein said dry solid product is liposomal, ion-exchange whey protein.

28. The method of claim 26, wherein the initial air temperature within the spray dryer is in the range of 130° F. to 155° F.

* * * * *